United States Patent
Wada et al.

(10) Patent No.: US 6,886,970 B2
(45) Date of Patent: May 3, 2005

(54) INDICATING INSTRUMENT FOR VEHICLE

(75) Inventors: Toshiki Wada, Kariya (JP); Katsuhiro Kumazawa, Anjo (JP); Takaaki Muramatsu, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/206,068

(22) Filed: Jul. 29, 2002

(65) Prior Publication Data

US 2003/0043049 A1 Mar. 6, 2003

(30) Foreign Application Priority Data

Sep. 4, 2001 (JP) .......................... 2001-267928
Jun. 11, 2002 (JP) .......................... 2002-169961

(51) Int. Cl.[7] ............................................. B60Q 1/00
(52) U.S. Cl. ...................... 362/489; 362/464; 362/512; 362/276
(58) Field of Search ............................... 362/489, 464, 362/512, 318, 276

(56) References Cited

U.S. PATENT DOCUMENTS

| | | | | |
|---|---|---|---|---|
| 4,310,871 A | * | 1/1982 | Adachi | 362/23 |
| 4,425,604 A | * | 1/1984 | Imai et al. | 362/223 |
| 4,832,468 A | * | 5/1989 | Ito et al. | 350/357 |
| 5,994,840 A | * | 11/1999 | Forsdyke et al. | 313/635 |
| 6,120,159 A | * | 9/2000 | Inoguchi et al. | 362/29 |
| 6,224,222 B1 | * | 5/2001 | Inoguchi et al. | 362/29 |
| 6,404,463 B1 | * | 6/2002 | Knoll et al. | 349/1 |
| 6,467,935 B1 | * | 10/2002 | Schwab | 362/354 |

FOREIGN PATENT DOCUMENTS

| | | | | |
|---|---|---|---|---|
| JP | A-64-57241 | * | 3/1989 | G20F/1/17 |
| JP | A-2-234857 | | 9/1990 | |

* cited by examiner

*Primary Examiner*—Stephen Husar
*Assistant Examiner*—Jacob Y. Choi
(74) *Attorney, Agent, or Firm*—Posz Law Group, PLC

(57) ABSTRACT

An indicating instrument for a vehicle includes a dial plate, a light modulation member disposed on the dial plate and a controller for controlling the light transmissivity. The light modulation member has variable light transmissivity, and the controller changes the light transmissivity according to a condition of the vehicle when operated.

15 Claims, 6 Drawing Sheets

FIG. 6
| | A | | | | |
|---|---|---|---|---|---|
| | $A_1$ | $A_2$ | $A_3$ | ... ... ... | $A_n$ |
| B | $B_1$ | $B_2$ | $B_3$ | ... ... ... | $B_n$ |
| E | $E_1$ | $E_2$ | $E_3$ | ... ... ... | $E_n$ |
FIG. 7
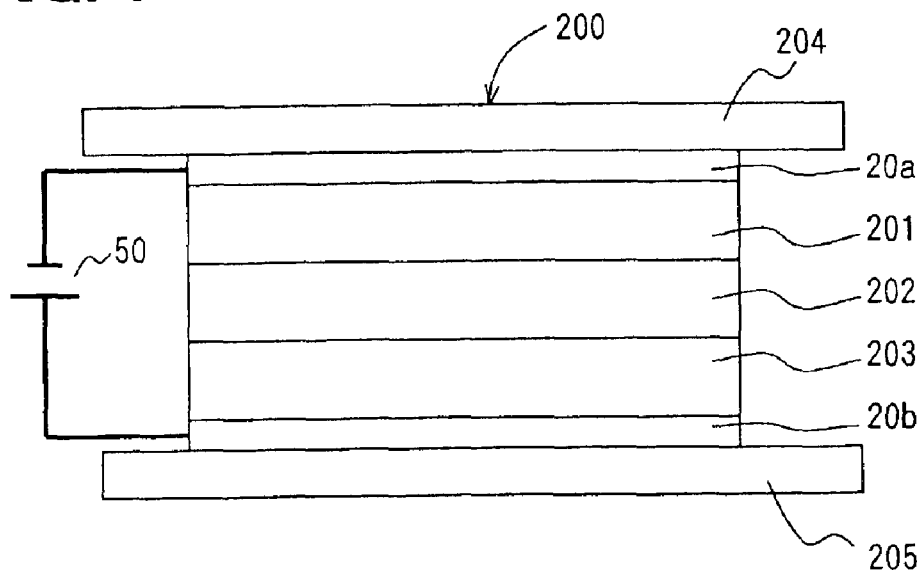
FIG. 8
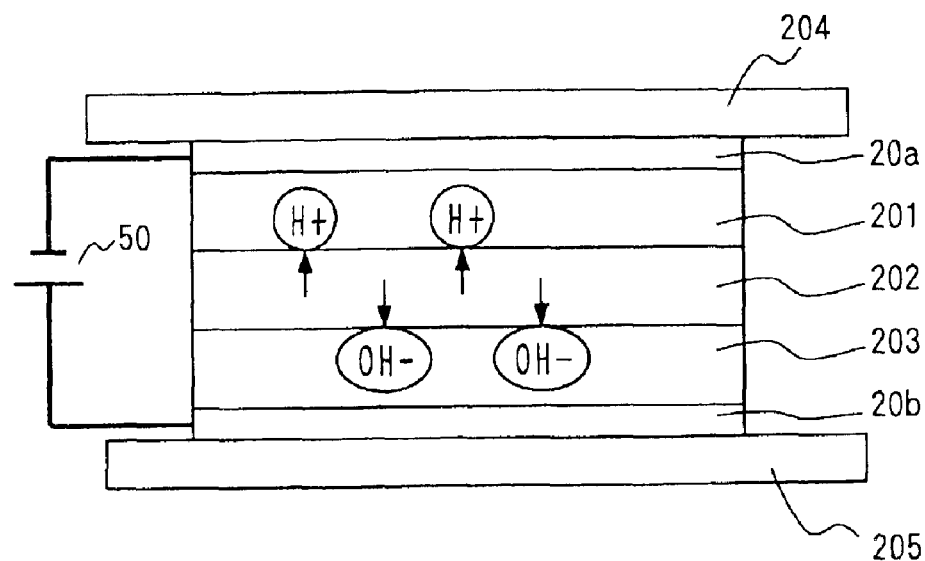

INDICATING INSTRUMENT FOR VEHICLE

CROSS REFERENCE TO RELATED APPLICATION

The present application is based on and claims priority from the following Japanese Patent Applications: 2001-267928, filed Sep. 4, 2001; and 2002-169961, filed Jun. 11, 2002, the contents of which are incorporated herein by reference.

BACKGROUND OF THE INVENTION

1. Field of the Invention

The present invention relates to an indicating instrument for a vehicle, particularly an automobile.

2. Description of the Related Art

Recently, in an indicating instrument for an automobile, various arrangements have been adopted to provide novel and attractive displays such as an arrangement of an indicating instrument disclosed in JP-A-2-234857. In the disclosed indicating instrument, a so-called black face meter is provided.

Some indicating instruments that are equipped with a colored face meter instead of the black face meter have also appeared. Lustrous metal members are sometimes put on display portions of the dial plate so as to add a luxurious and precise atmosphere to the indicating instruments.

However, extraneous light such as sunlight may reflect if it meets some of such lustrous metal members. In such a case, a driver cannot see the display portions very well.

SUMMARY OF THE INVENTION

Therefore, the present invention has been made in view of the above problem.

It is a main object of the invention to provide an improved indicating instrument for a vehicle that has a controllable light modulation member that provides a desired visibility as well as a novel and luxurious design.

According to a feature of the invention, control means increases light transmissivity of the light modulation member to a maximum value when the vehicle is not operated and changes the light transmissivity according to various conditions of the vehicle to provide a suitable visibility when the vehicle is operated. Therefore, the light modulation member becomes almost transparent so as to make the dial plate conspicuous and attractive when the vehicle is not operated. On the other hand the light modulation member is controlled according to environmental conditions so that a driver can best see displays on the dial plate when the vehicle is operated.

According to another feature of the invention, the dial plate is made of a lustrous member so as to add luxurious and precise atmosphere to the indicating instrument. Preferably, the light modulation member is made of an electrochromic display device (ECD). Therefore, the light transmissivity can be changed easily.

A first illuminance sensor may be added to detect illuminance of the surface of the dial plate. In this case, the control means controls the light transmissivity according to the illuminance of the surface of the dial plate when the ignition switch of the vehicle is turned on. Therefore, a driver can see displays of the dial plate very clearly. A second illuminance sensor for detecting illuminance inside the passenger compartment of the vehicle may be further provided, so that the control means calculates a target illuminance of the surface of the dial plate from the detected illuminance inside the passenger compartment and controls the light transmissivity of the light modulation member according to the target illuminance and the illuminance of the surface of the dial plate when the ignition switch is turned on.

The above light modulation member may be a thin-film solid-type electrochromic display device. Therefore, the color of the dial plate can change when a driver starts driving the vehicle out of a parking lot.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 6 illustrates a map for calculating control voltage to be applied to the light modulation film from illuminance of a passenger compartment and a target illuminance of the surface of the dial plate of the indicating instrument;

FIG. 7 is a schematic diagram illustrating another example of the light modulation film, which is made of a thin-film solid-type electrochromic display device;

FIG. 8 is a schematic diagram illustrating a mechanism of color development of the thin-film solid-type electrochromic display device;

DETAILED DESCRIPTION OF THE PREFERRED EMBODIMENTS

Figure 1:
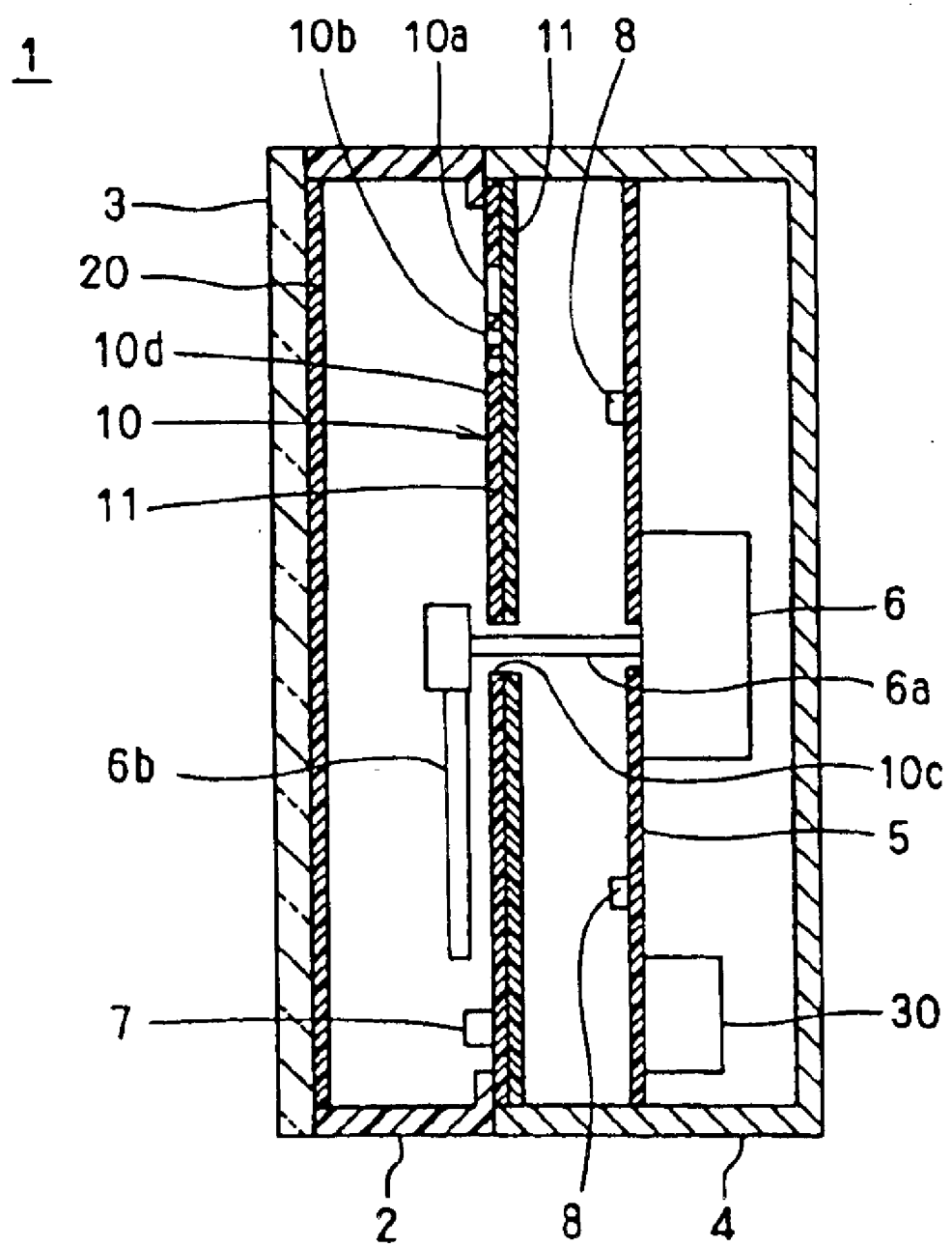
FIG. 1 is a schematic cross-sectional diagram of a combination meter, which is cut along line I—I in FIG. 2, according to a preferred embodiment of the invention.
Figure 2:
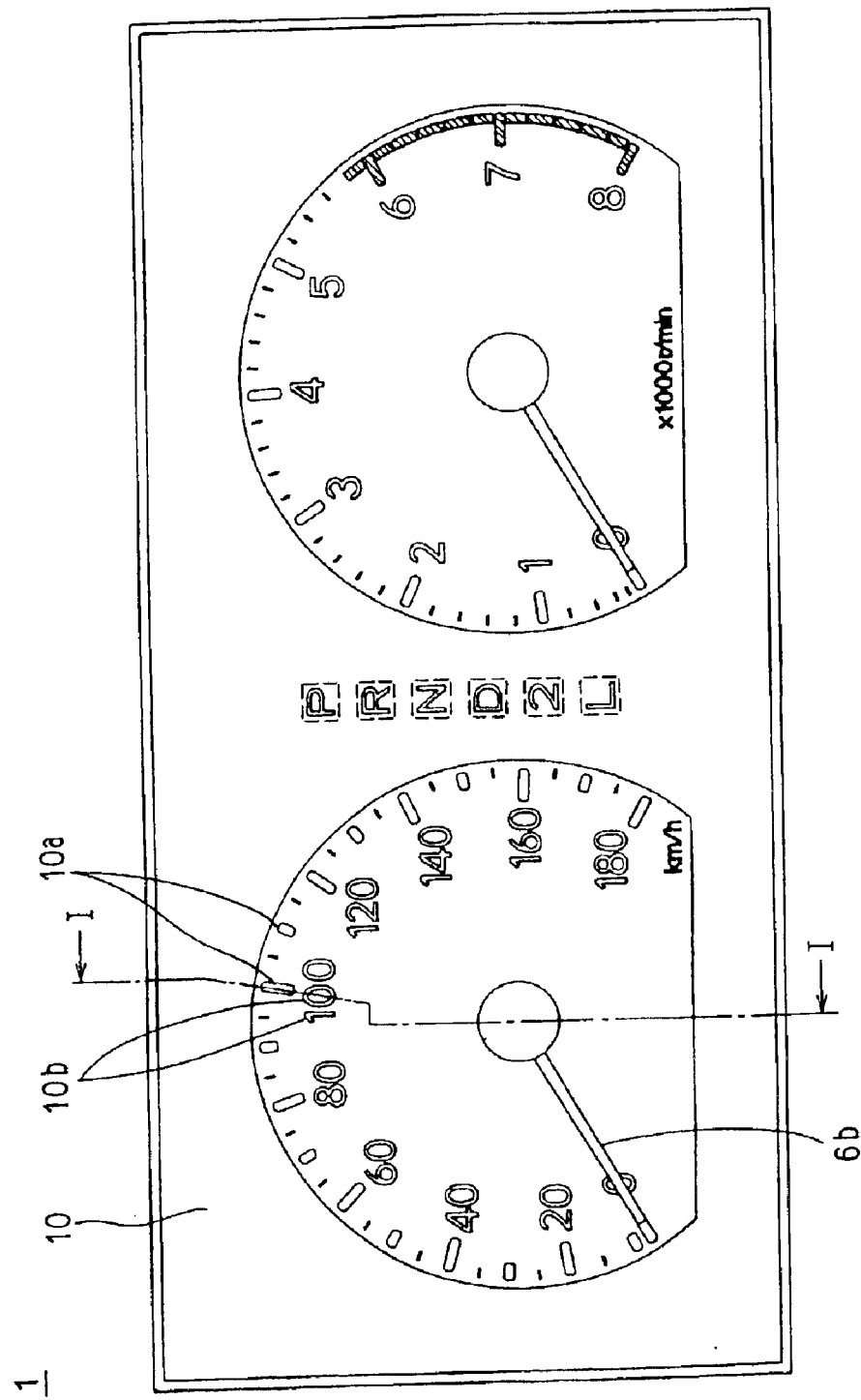
FIG. 2 is a front view of the combination meter according to the preferred embodiment.

As shown in FIGS. 1 and 2, a combination meter 1, which is a typical indicating instrument for a vehicle, is disposed at a front position of a vehicle where a driver can see it easily. The combination meter 10 has a dial plate 10. The dial plate 10 is made of a thin aluminum sheet or the like and is provided with one or more display portions 10d. Each display portion 10d has a plurality of graded scales 10a and characters 10b that are formed by stamping or etching. The display portion 10d has a lustrous surface ornamented with a pattern such as hairlines or fish scales. A dial surface illuminance sensor 7 is fixed on the display portion 10d to detect illuminance or density of incident light flux at the display portion 10d.

A light conducting plate 11 is fixed to the back of the dial plate 10 to conduct light emitted from a pair of light emitting diodes (LED) 8 to the graded scales 10a and characters 10b to illuminate the same. The light conducting plate 11 is made of a transparent or semitransparent acrylic material.

The dial plate 10 and the light conducting plate 11 are covered by a casing 4 at the back thereof. The casing 4 also accommodates a printed circuit board 5 of the combination meter 1. A movement 6 that rotates its shaft 6a according to an outside signal is fixed to the printed circuit board 5. The shaft 6a extends upward from a center hole 10c of the dial plate 10 and carries a pointer 6b at its top end. The pointer 6b is a so-called self-illuminating pointer such as a pointer made of an electric discharge tube or a light-conducting member that introduces light from outside. The pair of light emitting diodes 8 is fixed to the front surface (which faces the dial plate 10 and the light conducting plate 11) of the printed circuit 5. A controller 30 is also fixed to the back of the printed circuit board 5. The controller 30 is made of a hybrid IC that includes a data memory 30a to control voltage applied to a light modulation film 20.

A transparent cover 3 is fixed to an end of a ring-shaped hood 2 to cover the front surface of the dial plate 10. The transparent cover 3 is made of a transparent polycarbonate plate or the like. A light modulation film 20 is pasted on the whole surface of the transparent cover 3 opposite the dial plate 10. The light modulation film 20 is a film member that has a variable light transmissivity.

Figure 3:
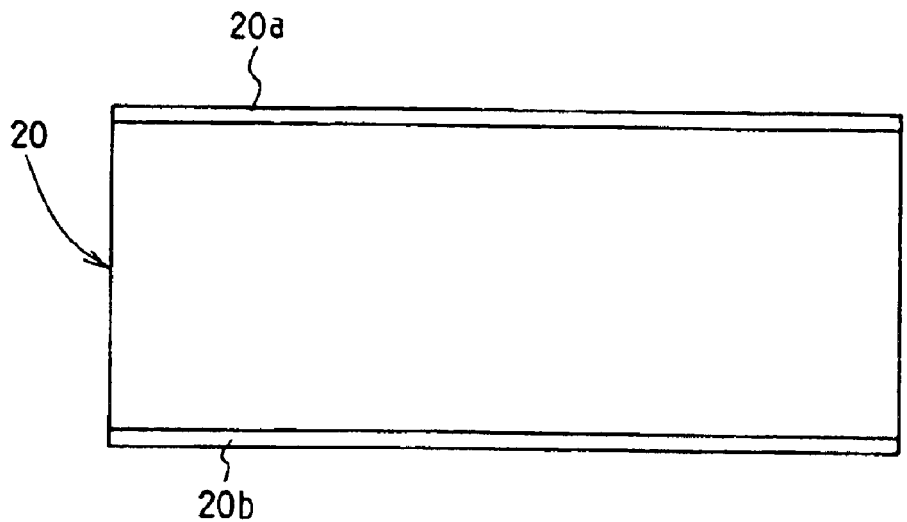
FIG. 3 is a schematic front view of a light modulation film of the combination meter according to the preferred embodiment.

The light modulation film 20 is comprised of an electrochromic display device (ECD) that is disposed between, and protected by, a pair of glass panels. As shown in FIG. 3, the light transmissivity of the light modulation film 20 is changed when voltage applied across electrodes 20a and 20b is changed. When the voltage applied across the pair of the electrode is zero, the light transmissivity is the highest, so that the light modulation section becomes transparent. As the voltage becomes higher, the light transmissivity lowers. When the voltage becomes a maximum value Ec, the light transmissivity becomes the lowest, so that the light modulation section becomes dark blue or black. The dial surface illuminance sensor 7 is fixed to the front surface of the dial plate 10. The illuminance sensor 7 may be disposed on the printed circuit board behind the dial plate 10.

Figure 4:
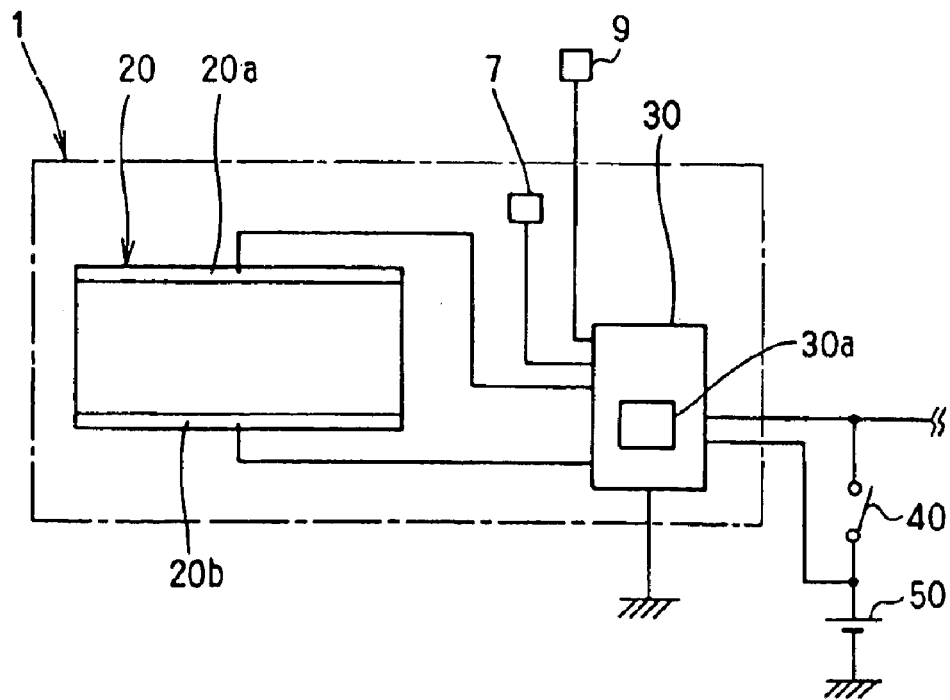
FIG. 4 is a circuit diagram of a controller for controlling the light transmissivity of the light modulation film.

As shown in FIG. 4, a passenger compartment illuminance sensor 9 is disposed inside the passenger compartment of a vehicle at a portion thereof above the dash board, rear tray or driver's head rest.

The controller 30 controls the voltage applied to the light modulation film 20 according to the output signals of the illuminance sensors 7 and 9. In other words, the controller 30 controls the transmissivity of the light modulation film 20 to provide a suitable illuminance on the display portions 10d so that a driver can best see the display portions 10d. As shown in FIG. 4, the controller 30 includes a memory 30a. The controller 30 is connected to the dial surface illuminance sensor 7, the passenger compartment illuminance sensor 9, an ignition switch 40 and the electrodes 20a, 20b of the light modulation film 20.

Figure 5:
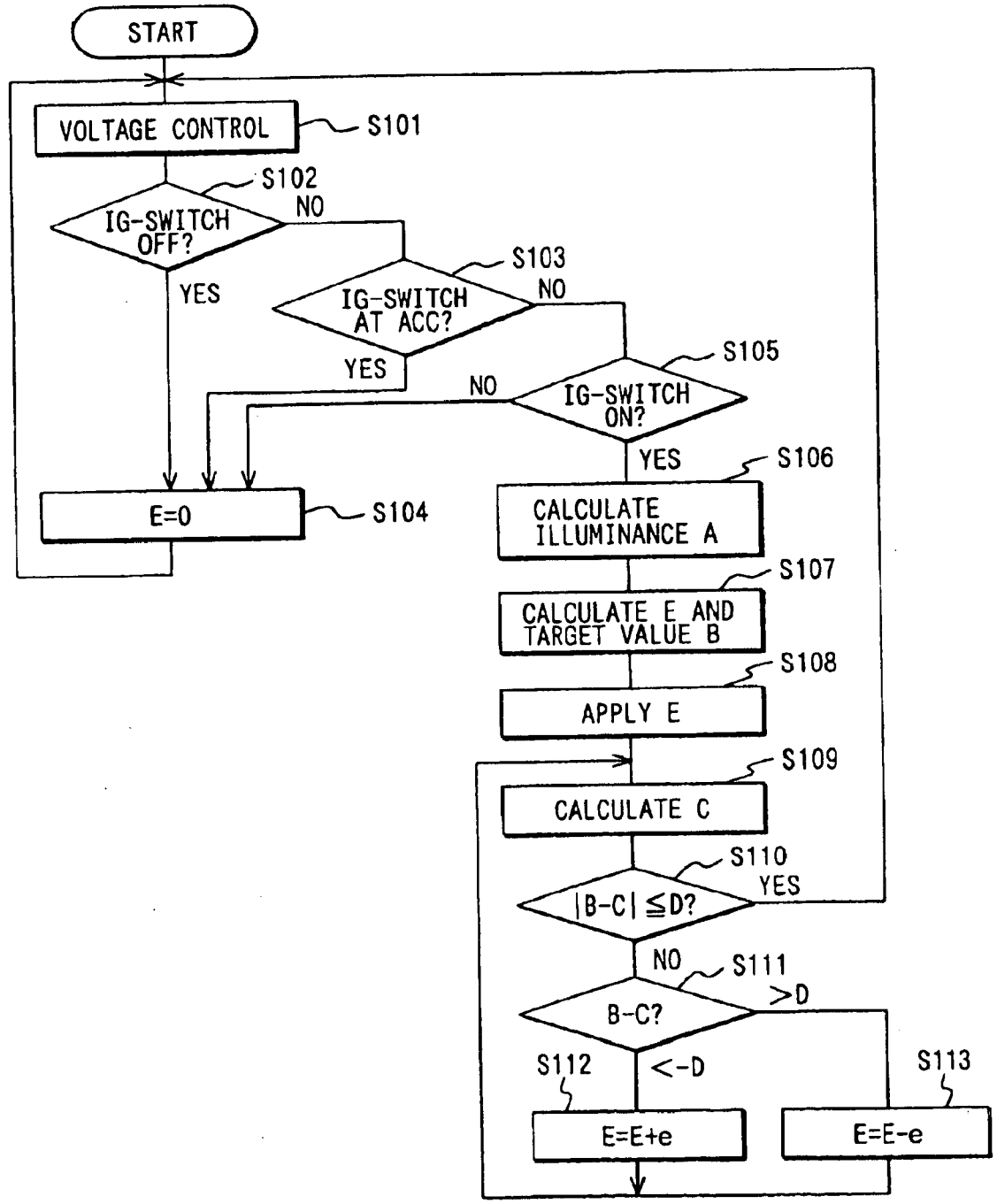
FIG. 5 is a flow diagram of voltage control operation of the controller.

The controller controls the voltage applied to the light modulation film 20 according to a program shown in FIG. 5.

At S101, the controller 30 starts control of the voltage applied to the light modulation film 20. Then, whether the ignition switch 40 is turned off is examined at S102.

If the result is YES, the control voltage to be applied to the light modulation film 20 is set at 0. If the result is NO, whether the ignition switch is at ACC or not is examined at S103 and the control voltage is set at 0 if the result is NO.

If the result of S103 is NO, whether the ignition switch 40 is turned on or not is examined at S105, and the control voltage is set at 0 if the result is NO. Therefore, the light transmissivity of the light modulation film 20 is the maximum, so that the film 20 remains transparent. Therefore, a driver can see the lustrous novel and attractive dial plate clearly.

If the driver turns on the ignition switch 40, result of S105 is YES. Consequently, the controller 30 is powered by a battery 50 and controls the voltage applied to the light modulation film 30 at steps S106–S113. Concurrently, the pair of light emitting diodes 8 is lit to illuminate the plurality of scales 10a and characters 10b, and the pointer 6 is also lit. At S106, an illuminance A of the passenger compartment is calculated according to the signal of the passenger compartment illuminance sensor 9. At S107, a target value B of the illuminance at the surface of the dial plate 10 and the corresponding control voltage E to be applied to the light modulation film 20 are calculated from a map shown in FIG. 6. The map is stored in the memory 30a that is disposed inside the controller 30. In the map, the target value B becomes larger as the illuminance A of the passenger compartment increases. In other words, the control voltage E to be applied to the light modulation film 20 becomes higher as the passenger compartment becomes brighter. At S108, the control voltage E is applied to the light modulation film 20. Subsequently, the surface illuminance C of the dial plate 10 after the control voltage E is applied to the light modulation film 20 is calculated. Thereafter, the target value B and the actual surface illuminance C are compared to each other. The control voltage E is increased or decreased by a value e each time until the absolute value of the difference between the target value B and the actual surface illuminance C becomes equal to or less than D at steps S110–113. If the actual surface illuminance C is larger than the target value B, the control voltage E is increased stepwise at S112 to decrease the light transmissivity of the light modulation film 20. On the other hand, if the actual surface illuminance C is smaller than the target value B, the control voltage E is decreased stepwise at S113 to increase the light transmissivity of the light modulation film 20. The absolute value D is determined according to test results. The value e is determined so that the voltage control of the controller can be completed in a short time.

While the vehicle is not operated, a driver sees the lustrous, novel and attractive dial plate 10 through the transparent light modulation film 20. While the driver operates the vehicle, he or she can see the scales and characters clearly without being dazzled by reflection of the dial plate and a virtual image of the dial plate reflected in the windshield.

The pointer 6b and the light emitting diodes 8 can be also controlled to change the luminance thereof. In that case, duty ratio of the voltage applied to the light emitting diode may be controlled. The light emitting diodes 8 can be replaced by electric-light bulbs. The metal plate of the dial plate 10 can be replaced by a resinous member plated or coated with metal. The transparent cover 3 may be omitted if the light modulation film 20 is strong enough to protect the dial plate 10.

A light modulation film 200, as a variation of the light modulation film 20, is described with reference to FIG. 7. The light modulation 200 is comprised of three layers of thin solid-state electrochromic display elements 201, 202, 203, a pair of transparent electrode films 20a, 20b that sandwiches the electrochromic display elements 201, 202, 203, and a pair of glass covers 204, 205 that covers the above members.

The element 201 that forms the first layer is a deoxidizing chromophoric film (e.g. $WO_3$), the element 202 that forms the second layer is a solid-state electrolyte film (e.g. $Ta_2O_3$), and the element 203 that forms the third layer is an oxidizing chromophoric film (e.g. $Ir(OH)_n$).

When no battery voltage is applied across the pair of electrodes film 20a and 20b, all the electrochromic display elements 201, 202, 203 are transparent and colorless.

Figure 9:
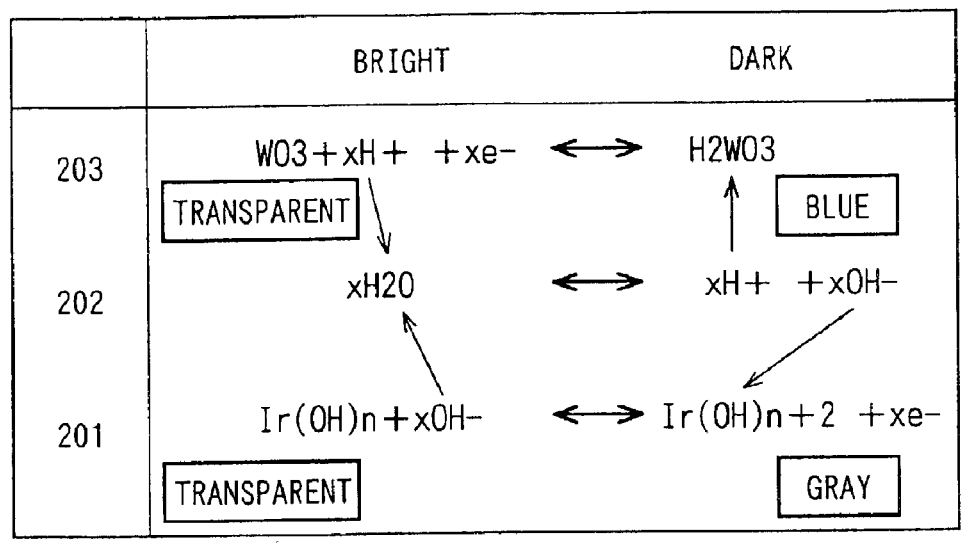
FIG. 9 is a schematic diagram illustrating the principle of the color development of the thin-film solid-type electrochromic display device.

When the battery voltage is applied across electrodes 20a and 20b so that positive voltage being applied to the element 203 of the oxidizing chromophoric film, $H^+$ ion moves from the element 202 of the solid state electrolyte film to the element 201 of the deoxidizing chromophoric film, as shown in FIG. 8. At the same time $OH^-$ ion moves from the element 202 of the solid-state electrolyte film to the element 203 of the oxidizing chromophoric film. As shown in FIG. 9, a deoxidizing reaction takes place at the element 203 of the oxidizing chromophoric film, and the element 203 becomes blue. At the same time, an oxidizing reaction takes place at the element 201 of the deoxidizing chromophoric film, and the element 201 becomes gray or opaque.

Figure 10:
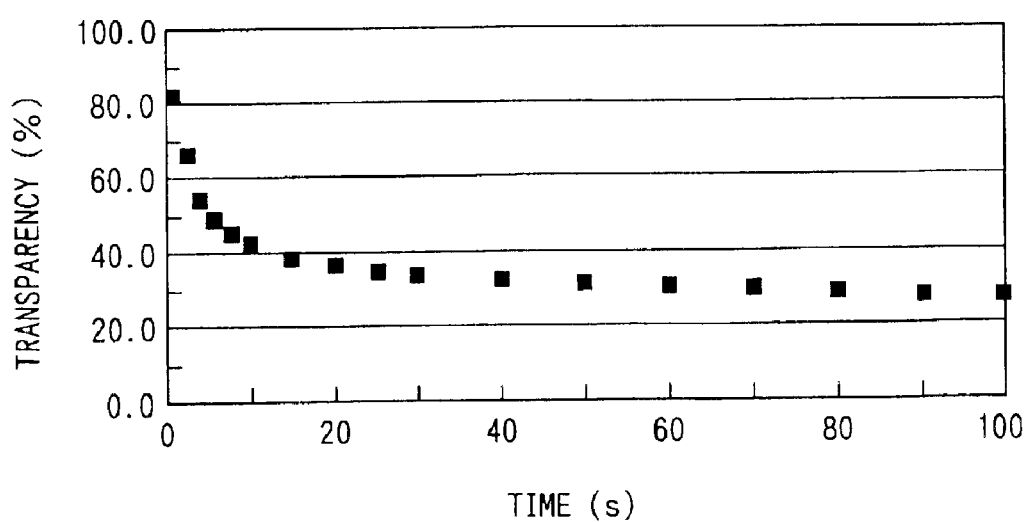
FIG. 10 is a graph showing a characteristic curve of the light transmissivity of the light modulation film relative to time passing after the control voltage is applied to the thin-film solid-type electrochromic display device.

As shown in FIG. 10, the transparency of the light modulation film 200 gradually decreases after the battery voltage is applied thereto and becomes almost constant when 30 seconds pass. The color of the light modulation film 200 also becomes bluer after the battery voltage is applied thereto and becomes almost unchanged after 30 seconds pass. Thus, the dial plate is made look novel, luxurious and attractive.

The above described thin solid-state electrochromic elements can be substituted by gel-state electrochromic elements. The ground color of the dial plate 10 can be changed to any color other than metallic color. It is possible to only change the transparency of scales and characters of the dial plate 10.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An indicating instrument for a vehicle comprising:
   a dial plate having an ornamental, lustrous surface and a display portion;
   a light modulation member having variable light transmissivity disposed on said dial plate;
   an illuminance sensor for sensing illuminance conditions of said display surface caused by extraneous lights; and
   a control means for controlling said light transmissivity;
   wherein said control means increases said light transmissivity to a maximum value so that a driver can see the ornamental, lustrous surface through the light modulation member when said vehicle is not operated and controls said light transmissivity according to the illuminance conditions of said display surface so that the driver can see the display portion through the light modulation member without reflection of extraneous lights when said vehicle is operated.

2. The indicating instrument as claimed in claim 1, wherein said light modulation member comprises an electrochromic display device.

3. The indicating instrument as claimed in claim 1, wherein said control means comprises a first illuminance sensor for detecting illuminance of the surface of said dial plate, and wherein said control means controls said light transmissivity according to said illuminance when the ignition switch of said vehicle is turned on.

4. The indicating instrument as claimed in claim 3, wherein said control means further comprises a second illuminance sensor for detecting illuminance inside the passenger compartment of said vehicle, wherein said control means calculates a target illuminance of the surface of said dial plate from said illuminance inside the passenger compartment and controls said light transmissivity of said light modulation member according to said target illuminance and the illuminance of the surface of said dial plate when said ignition switch is turned on.

5. The indicating instrument as claimed in claim 1, wherein said light modulation member comprises a thin-film solid-type electrochromic display device.

6. The indicating instrument as claimed in claim 1, further comprising a self-illuminating pointer disposed on said dial plate, a light emitting element for illuminating said dial plate, wherein said control means controls said light transmissivity a said light modulation member to provide a suitable illuminance for the driver to see said display portion when said self-illuminating pointer and said light emitting element are operated.

7. The instrument as claimed in claim 6, wherein said dial plate is made of a metal plate.

8. The indicating instrument as claimed in claim 6, wherein said dial plate comprises a resinous member coated with a thin metal sheet.

9. An indicating instrument for a vehicle comprising:
   a dial plate having a lustrous ornament and display portion that includes a graded scale;
   a light modulation member having variable light transmissivity, wherein the light modulation member covers the dial plate;
   an illuminance sensor for sensing the illuminance of the display surface caused by extraneous lights; and
   a controller for controlling the light transmissivity of the light modulation member, wherein the controller increases the light transmissivity to a maximum value so that a driver can see the ornament through the light modulation member when the vehicle is not operated and controls the light transmissivity according to the illuminance sensed by the illuminance sensor so that a driver can see the display portion through light modulation member without reflection of extraneous lights when the vehicle is operated.

10. An indicating instrument for a vehicle comprising:
    a dial plate having a lustrous ornament and a graded scale;
    a light modulation member located on the dial plate, wherein the light modulation member has a variable light transmissivity;
    a controller for controlling the light transmissivity of the light modulation member according to extraneous illuminance conditions, wherein the controller increases the light transmissivity to a maximum value so that a driver can see the ornament through the light modulation member when the vehicle is not operated and changes the light transmissivity according to the extraneous illuminance conditions so that a driver can see the graded scale through the light modulation member without reflection of extraneous lights when the vehicle is operated.

11. The indicating instrument as claimed in claim 10, wherein the light modulation member comprises an electrochromic display device.

12. The indicating instrument as claimed in claim 10, wherein the controller comprises a first illuminance of the sensor for detecting the illuminance of the surface of the dial plate, and the controller controls the light transmissivity according to the detected illuminance when the ignition switch of the vehicle is turned on.

13. The indicating instrument as claimed in claim 12, wherein the controller further comprises a second illuminance sensor for detecting illuminance inside the passenger compartment of the vehicle, wherein the controller calculates a target illuminance of the surface of the dial plate from the illuminance inside the passenger compartment and controls the light transmissivity of the light modulation member according to the target illuminance and the illuminance of the surface of the dial plate when the ignition switch is turned on.

14. The indicating instrument as claimed in claim 10, wherein the light modulation member comprises a thin-film solid-type electrochromic display device.

15. The indicating instrument as claimed in claim 10, comprising a self-illuminating pointer disposed on said dial plate, a light emitting element for illuminating said dial plate, wherein said controller controls said light transmissivity of said light modulation member to provide a suitable illuminance for the driver to see said display portion when said self-illuminating pointer and said light emitting element are operated.

* * * * *